(12) United States Patent
Crosby et al.

(10) Patent No.: US 9,842,418 B1
(45) Date of Patent: Dec. 12, 2017

(54) GENERATING COMPOSITIONS

(71) Applicant: Google Inc., Mountain View, CA (US)

(72) Inventors: Wayne Crosby, San Mateo, CA (US); Matthew Steiner, Los Altos, CA (US)

(73) Assignee: Google Inc., Mountain View, CA (US)

( * ) Notice: Subject to any disclaimer, the term of this patent is extended or adjusted under 35 U.S.C. 154(b) by 346 days.

(21) Appl. No.: 14/472,862

(22) Filed: Aug. 29, 2014

Related U.S. Application Data (60) Provisional application No. 61/875,019, filed on Sep. 7, 2013.

(51) Int. Cl.
  *H04N 7/00* (2011.01)
  *G06T 11/60* (2006.01)
  *H04N 5/232* (2006.01)

(52) U.S. Cl.
  CPC ......... *G06T 11/60* (2013.01); *H04N 5/23203* (2013.01); *H04N 5/23229* (2013.01); *H04N 5/23238* (2013.01)

(58) Field of Classification Search
  CPC  G06T 11/60; H04N 5/23203; H04N 5/23229; H04N 5/23238
  USPC .......................................................... 348/36
  See application file for complete search history.

(56) References Cited

U.S. PATENT DOCUMENTS

| | | | |
|---|---|---|---|
| 2010/0311512 A1* | 12/2010 | Lock .................. | A63F 13/00 473/199 |
| 2011/0117934 A1* | 5/2011 | Mate .................. | G06Q 30/02 455/456.3 |
| 2012/0120201 A1* | 5/2012 | Ward .................. | G06T 19/006 348/47 |
| 2013/0015946 A1* | 1/2013 | Lau .................... | G07C 9/00 340/5.2 |
| 2013/0117832 A1* | 5/2013 | Gandhi .............. | H04L 9/3271 726/7 |
| 2013/0169675 A1* | 7/2013 | Shulman ............ | G01C 21/3647 345/629 |

* cited by examiner

*Primary Examiner* — Jared Walker (57) ABSTRACT

Implementations generally relate to generating multiple user media compositions (e.g., photo compositions) in connection with a social network system. In one implementation, a method includes detecting a plurality of devices based on one or more location criteria. The method also includes synchronizing an actuation of the plurality of devices. The method also includes receiving photos from the plurality of devices. The method also includes generating one or more compositions from the photos.

20 Claims, 8 Drawing Sheets

GENERATING COMPOSITIONS

RELATED APPLICATIONS

This application claims the benefit of U.S. Provisional Application No. 61/875,019, entitled "GENERATING COMPOSITIONS" and filed on Sep. 7, 2013, which is incorporated herein by reference in its entirety.

BACKGROUND

Social network systems often enable users to upload photos captured from camera devices (e.g., smart phones). Various users may capture the same target subject matter from different perspectives, angles, distances, lighting and points of view. After a user uploads photos to a social network system, the social network system typically enables the user to create photo compositions from one or more photos. The user can determine which photos to include in each composition.

SUMMARY

Implementations generally relate to generating multiple user photo compositions in a social network system. In one implementation, a method includes detecting a plurality of devices based on one or more location criteria. The method also includes synchronizing an actuation of the plurality of devices. The method also includes receiving photos from the plurality of devices. The method also includes generating one or more compositions from the photos.

With further regard to the method, in some implementations each of a plurality of devices is synchronized to actuate at the same time. In some implementations, the one or more compositions include panorama compositions based on a combination of the photos. In some implementations, the synchronizing of the actuation of the plurality of devices corresponds to an event. In some implementations, the one or more compositions include high dynamic range compositions.

With further regard to the method, in some implementations, the devices are associated with users, and wherein the users are members of a social network. In some implementations, the one or more location criteria are based on check-in data. In some implementations, the generating of compositions includes providing the one or more compositions to a user.

Some implementations can include a system comprising one or more processors configured to perform operations. The operations can include detecting a plurality of devices at or near a same location based on one or more location criteria, and synchronizing an actuation of a function in each of the devices. The operations can also include receiving media captured by the function from each of the devices. The operations can further include generating one or more compositions from the media received from each device.

The plurality of devices can be synchronized to actuate the function at the same time. The media can include photos and the one or more compositions can include panorama compositions based on a combination of the photos. The synchronizing of the actuation of the plurality of devices corresponds to an event. The devices can be associated with users, and the users can be members of a social network.

The one or more location criteria can be based on one or more of distance measurements between devices and distance measurements from a device to another object.

Some implementations can include a nontransitory computer readable medium having stored thereon software instructions that, when executed by a processor, cause the processor to perform operations. The operations can include detecting a plurality of devices at or near a same location based on one or more location criteria, and synchronizing an actuation of a function in each of the devices. The operations can also include receiving media captured by the function from each of the devices. The operations can further include generating one or more compositions from the media received from each device.

The plurality of devices can be synchronized to actuate the function at the same time. The media can include photos and the one or more compositions can include panorama compositions based on a combination of the photos. Each device can be associated with a respective user, and the users can be members of a social network. The one or more location criteria can be based on check-in data.

DETAILED DESCRIPTION

Implementations for generating media compositions (e.g., multiple user photo or video compositions) are described. In various implementations, a system detects devices based on one or more criteria (e.g., location, social network connection or the like). In some implementations, the system synchronizes an actuation of the plurality of devices (e.g., synchronizes capture of a photo, video or audio). The system then receives media (e.g., photos) from the plurality of devices. The system then generates one or more compositions from the photos. The system can then provide the one or more compositions to one or more users.

In some implementations, the devices can be synchronized to actuate at the same time. For example, a timer may synchronize the actuation of client devices. In response to a timer reaching a particular predetermined timing parameter, devices may be automatically actuated to capture target subject matter. In some implementations, the one or more compositions include panorama compositions based on a combination of the photos. In some implementations, the system determines that the photos correspond to an event. In some implementations, the one or more compositions include high dynamic range compositions. In some implementations, the devices are associated with users, and the users are members of a social network. In some implementations, the one or more location criteria are based on distance measurements between devices. In some implementations, the one or more location criteria are based on check-in data, where a user checks in to an organized event or location.

In some implementations, the devices are synchronized to minimize distortion. In some implementations, the system determines that the photos correspond to a predetermined time period. In some implementations the system enables the user to filter images out of the composition. For example if a generated composition includes faces, a tree, and a pyramid, the system enables the user to filter out or remove the faces and create a photo that only includes the tree and the pyramid.

Figure 1:
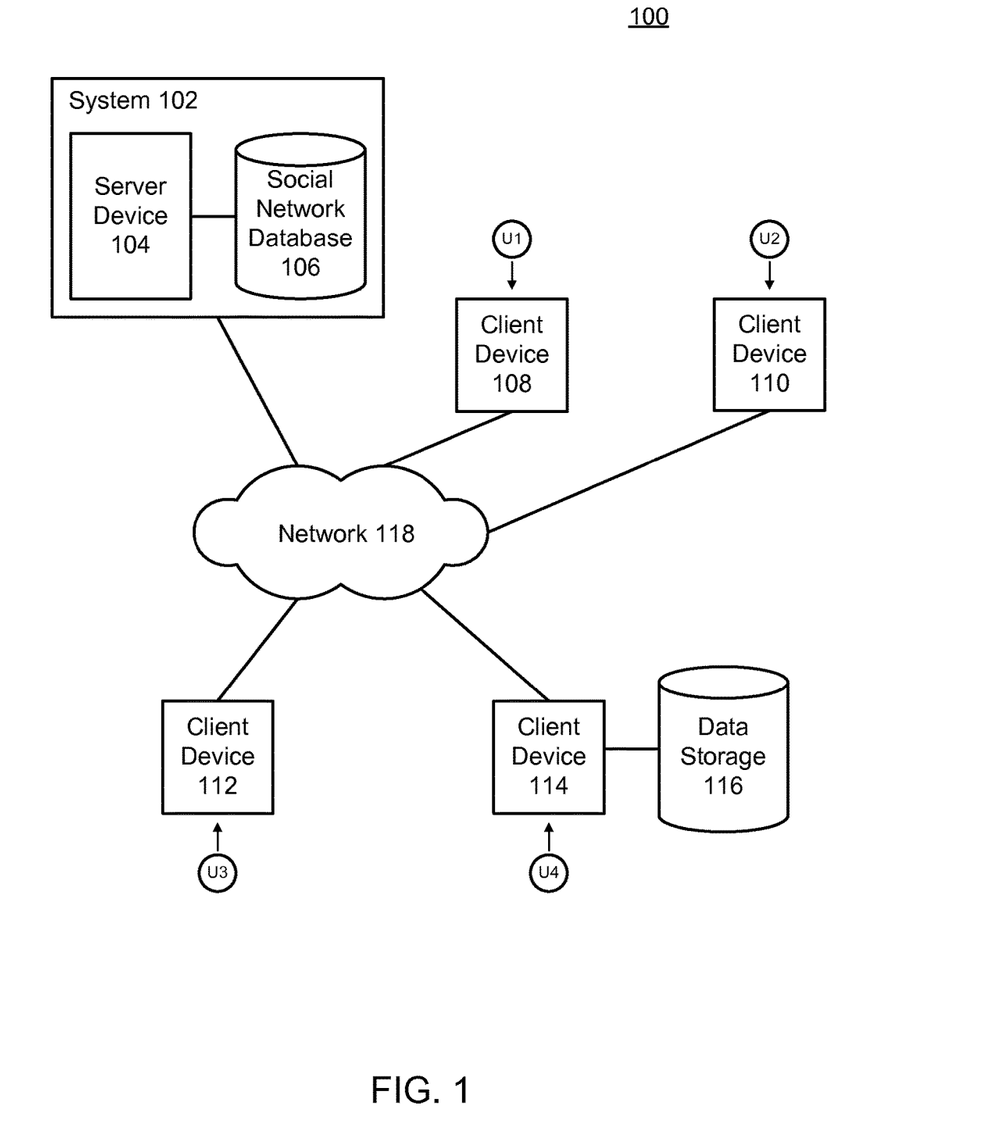
FIG. 1 illustrates a block diagram of an example network environment, in accordance with some implementations.

FIG. 1 illustrates a block diagram of an example network environment 100, which may be used to implement the implementations described herein. In one implementation, network environment 100 includes a system 102, which includes a server device 104 and a social network database 106. The term system 102 and phrase "social network system" may be used interchangeably. Network environment 100 also includes client devices 110, 120, 130, and 140, which may communicate with each other via system 102 and a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may collaborate with each other in generating compositions using respective client devices 110, 120, 130, and 140.

For ease of illustration, four example users U1, U2, U3, and U4 are described. There may be any number of users collaborating to generate compositions. For ease of illustration, four respective example client devices 110, 120, 130, and 140 are described. There may be any number of respective client devices to generate compositions.

Figure 2:
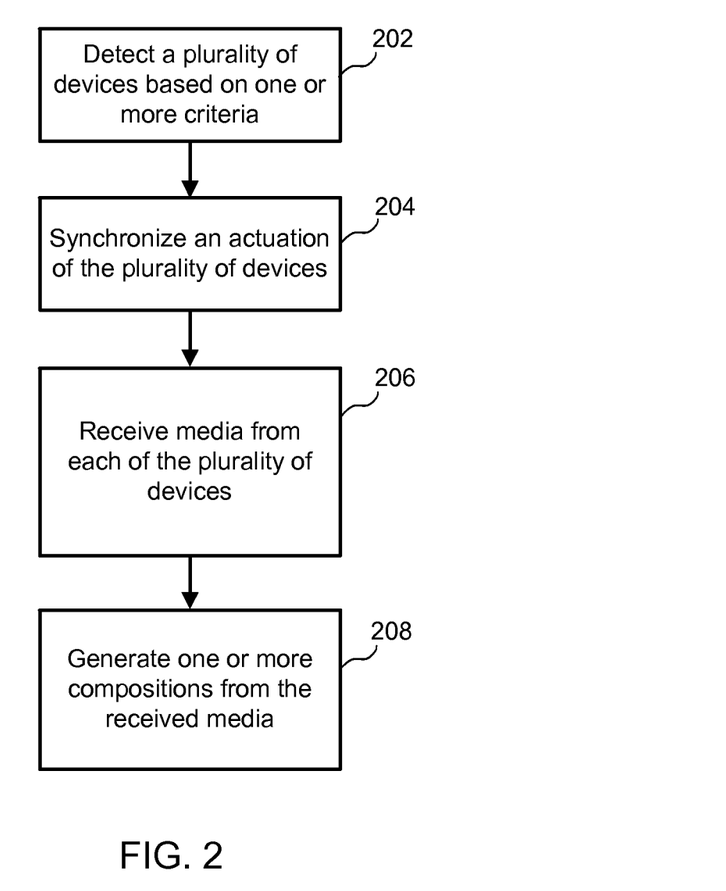
FIG. 2 illustrates an example simplified flow diagram for generating photo compositions in a social network system, in accordance with some implementations.

FIG. 2 illustrates an example simplified flow diagram for generating a composition (e.g., in a social network system), according to one implementation. Referring to both FIGS. 1 and 2, a method is initiated in block 202, where system 102 detects a plurality of devices based on one or more criteria (e.g., location). For example, users U1, U2, U3, and U4 may use respective client devices 110, 120, 130, and 140 to capture the same target subject matter. In one implementation, system 102 may receive an indication of location from a device, based on the global positioning system (GPS) capabilities of a device that automatically updates system 102 with device location. In one implementation, system 102 may determine device location based on a user's social check-in data. In some implementations, system 102 may detect locations based on geotagging, landmark recognition, or any other suitable means.

For example, user U1 visits a location such as Mount Everest to capture a number of photos, user U2 is also visiting Mount Everest, and both users are capturing a number of photos. System 102 may detect the location of client devices 110 and 120 associated with users U1 and U2, and recommend synchronizing actuation of client devices 110 and 120.

In block 204, system 102 synchronizes an actuation of the plurality of devices. For example, system 102 may automatically synchronize the actuation or triggering of the capturing of a target subject matter among client devices 110, 120, 130, and 140. In some implementations, target subject matter may include one or more of faces, people, objects, landmarks, scenes, scenery, panoramas, and/or anything that the user wishes to capture in a photo. The client devices 110, 120, 130, and 140 may be operated in an automatic actuation mode. In some implementations, the system 102 may utilize a timer to synchronize the actuation of client devices 110, 120, 130, and 140. In some implementations, in response to a countdown timer reaching a particular predetermined timing parameter, client devices 110, 120, 130, and 140 may be automatically actuated. In various implementations system 102 may synchronize actuation or recommend synchronization of actuation of client devices 110, 120, 130, and 140.

In some implementations, system 102 may use a predetermined time or preset time to synchronize the actuation of devices. For example, users may indicate that synchronization should occur at 3:00 p.m. local time.

In some implementations devices may be synchronized to actuate at the same time. For example, user U1 visits a location such as Mount Everest to capture a number of photos; and user U2 is also visiting Mount Everest, and both users are capturing a number of photos. System 102 may detect the location of client devices 110 and 120 associated with users U1 and U2, and recommend synchronizing the actuation of client devices 110 and 120. Users U1 and U2 may utilize a user interface to indicate that they would like to synchronize actuation of their devices, and to signal that they are both ready to capture target subject matter. System 102 then automatically initiates a synchronized countdown on client devices 110 and 120, starting, for example, from three seconds and counting down by one second increments to zero seconds. At zero seconds on the countdown, system 102 automatically actuates the capturing of target subject matter by client devices 110 and 120.

In some implementations, the synchronization of actuation may be based on the proximity of client devices 110, 120, 130, and 140. System 102 may establish proximity based on micro location signals (e.g., Bluetooth Low Energy (BLE) or the like), Wi-Fi connection signals, GPS signals, cellular triangulation signals, Near Field Communications (NFC) signals, Bluetooth signals, and/or ZigBee signals. In one implementation, system 102 may establish proximity based on users' check-in data. In some implementations, the synchronization of actuation may be based on a predetermined distance measurement between respective devices. In some implementations, the location of the devices can be based on distance measurements from each device to another object (e.g., to a wireless access point, a wireless communications system, a micro location beacon or the like).

In some implementations, the synchronization of actuation may be based on contacts in social network system 102. For example, users U1, U2, U3, and U4 can select one or more contacts within social network system 102, to which automatic synchronization of actuation of client devices 110, 120, 130, and 140 is to be applied.

In other implementations, users U1, U2, U3, and U4 can select one or more social network groups within social network database 106. System 102 may then automatically synchronize the actuation of client devices 110, 120, 130, and 140. For example, a user can select a "Friends" social network group indicating that automatic synchronization of actuation is to be applied to devices of users within the "Friends" social network group.

In one implementation, system 102 may recommend synchronization of actuation based on events. For example, system 102 may detect that two or more users are attending the same event, in which case system 102 may recommend that the users synchronize the actuation of their respective devices to capture target subject matter. For example, system 102 may determine that users are at a gathering (e.g., via a check-in, an event registration process, etc.).

In some implementations, system may recommend actuation based on multiple predetermined criteria. For example, in some implementations, system 102 may recommend synchronization of actuation based on an event and a social network group. In some implementations, system 102 may recommend synchronization of actuation using a combination of proximity and a predetermined time. Actual combinations will depend on the specific implementations.

In some example implementations actuation includes triggering a capturing mechanism within client devices 110, 120, 130, and 140 to capture target subject matter. In one example implementation, actuation includes driving a camera lens or actuating an image capture device (e.g., camera) within client devices 110, 120, 130, and 140 to capture target subject matter. In various implementations, actuation may include the triggering of a capturing mechanism within client devices 110, 120, 130, and 140 to capture target subject matter, and the triggering of a flash device in one or more respective devices.

In block 206, system 102 receives media (e.g., photos, videos or the like) from a plurality of devices, for instance, client devices 110, 120, 130, and 140 associated with users U1, U2, U3, and U4 respectively. In various implementations, in the case of photos, the photos may be received when the users U1, U2, U3, and U4 upload the photos to system 102 or after users U1, U2, U3, and U4 add the photos to one or more photo albums. In some implementations, system 102 may enable client devices 110, 120, 130, and 140 to automatically upload photos to system 102 as users capture photos. In some implementations, the system obtains photos based on timing parameters.

In some implementations, system 102 determines one or more composition types from the photos. In some implementations, system 102 automatically determines the composition types from the photos upon receiving the photos. The composition types may include one or more of face compositions, high dynamic range compositions (e.g., photos having different parameters such as exposure or the like), panorama compositions, and/or photo booth compositions. As described in more detail below, system 102 determines which types of compositions can be generated from the photos. To do so, in various implementations, system 102 analyzes the photos to determine which photos are appropriate for each type of composition. For example, photos captured in burst mode (e.g., photos captured in quick succession) of a similar scene such as a landscape at the same exposure might make a visually appealing panoramic photo. However, some of these photos may not be appropriate for a high dynamic range (HDR) image since the photos were taken with the same exposure.

In various implementations, to determine the composition types that can be made from the photos, system 102 utilizes recognition algorithms to find photos appropriate for different composition types. For example, system 102 may utilize recognition algorithms to determine visual similarity among photos (e.g., similarity of any persons in the photos), and may utilize exchangeable image file format (EXIF) metadata to determine the elapsed time between photos. Example implementations of recognition algorithms are described in more detail below.

In some implementations, system 102 may use signals from recognition algorithms and from EXIF metadata in a hierarchical clustering algorithm, with potentially varying constraints per media type, in order to group constituent photos into photo bursts. In some implementations, system 102 may also use signals from social affinity data in a hierarchical clustering algorithm in order to group constituent photos into photo bursts.

In various implementations, to determine the composition types that can be made from the photos, system 102 utilizes clustering algorithms to cluster the photos based on one or more clustering criteria. For example, in some implementations, the clustering criteria may include photos taken within a predetermined time period. In some implementations, the clustering criteria may include photos having similar content. In some implementations, the clustering criteria may include photos having the same content.

In various implementations, system 102 combines these example clustering criteria and other clustering criteria in a variety of ways in clustering algorithms to determine the composition types that can be made from the photos.

In some implementations, if system 102 clusters two or more photos that have the same content, system 102 may determine that the two or more photos may be used to generate a face composition. For example, system 102 may determine that photos in a photo burst having the same face are candidate photos for a face composition.

In some implementations, if system 102 clusters two or more photos that have the same content and are captured in series at different exposure levels, system 102 may determine that the two or more photos may be used to generate a high dynamic range (HDR) composition.

In some implementations, if system 102 clusters two or more photos that have similar content, system 102 may determine that the two or more photos may be used to generate a panorama composition.

In some implementations, if system 102 clusters two or more photos that have different content, system 102 may determine that the two or more photos may be used to generate a photo booth composition.

Referring again to FIG. 2, in block 208, system 102 generates one or more compositions from the selected photos based on the one or more determined composition types. In various implementations, to generate compositions from the photos, system 102 selects candidate photos from the group of photos based on the determined composition types.

In some implementations, system 102 generates a panorama composition based on a combination of photos. System 102 may utilize photos captured from synchronized actuation of client devices 110, 120, 130, and 140 associated with a location.

In an example implementation, different photos may show a location including multiple objects (e.g., faces, a tree, and a pyramid) from different vantages points. A given location or scene may have many more objects, depending on the particular scenario. Furthermore, system 102 may collect numerous photos of a given object from many different vantage points.

In some implementations, system 102 combines the photos into a panorama composition of the location. In various implementations, system 102 applies an algorithm that aligns, normalizes, and stitches the photos into a single panorama composition. In various implementations, system 102 may generate a confidence measure, which can subsequently be used to identify and optionally reject poor quality panoramas.

In some implementations, photos are registered/aligned into a photo composite. In other implementations, photos are blended into a single photo composite.

Depending on the number of objects captured, photos available, points of view, etc., panorama compositions of locations may provide various types of panoramas of varying complexities (e.g., 360 degree panoramas, cylindrical panoramas, spherical panoramas, cubical panoramas, etc.). The specific panorama compositions generated will depend on the specific implementation.

In some implementations, system 102 enables the user to filter images out of the composition. For example if a generated panoramic composition includes faces, a tree and a pyramid, the user may wish to only have a panoramic composition that includes objects in the location, not including faces. System 102 may enable the user to filter out or remove images of the faces from the example panoramic composition. In various implementations, system 102 may provide the user with the option to retain the original panoramic composition that includes faces, the tree, and the pyramid as well as the newly generated filtered composition that includes the tree and the pyramid, without the faces.

In various implementations, system 102 notifies the user of the composition(s). For example, in some implementations, system 102 may send a message to the user indicating that system 102 has generated a particular composition and has added the composition to the user's upload stream or photo album. In various implementations, system 102 may generate and cause a visual badge to overlay a given composition. In various implementations, system 102 may generate and cause a second or combined visual badge to overlay the composition, where the visual badge indicates the type of media that it is (e.g., face composition, HDR composition, panorama composition, photo booth composition, etc.).

In some implementations, system 102 may provide a message (e.g., "This composition was automatically created from the photos you took.") to the user when the user moves a pointer (e.g., mouses over) over the visual badge.

In some implementations, system 102 may allow for some user interaction or feedback. For example, rather than automatically generating a composition, system 102 may detect photos that would make a composition, then prompt the user to initiate the generation of a face composition, HDR composition, panorama composition, photo booth composition, etc. (e.g., with a single click or selection of a button). In some implementations, system 102 may recommend appropriate types or combinations of types of compositions to the user given the available photos.

In some implementations, multiple types of compositions described herein may be applied to a photo or group of photos. In various implementations, system 102 may generate compositions that include different combinations of face compositions, HDR compositions, panorama compositions, and photo booth compositions, etc. For example, in some implementations, system 102 may generate a face composition within an HDR composition. In some implementations, system 102 may generate a panorama composition using a combination of HDR compositions and/or face compositions. Actual combinations will depend on the specific implementations.

Although the steps, operations, or computations in the method implementations described herein may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

In various implementations, system 102 may utilize a variety of image recognition algorithms to recognize faces, landmarks, objects, etc. in photos. Such recognition algorithms may be integral to system 102. System 102 may also access recognition algorithms provided by software that is external to system 102 and that system 102 accesses.

In various implementations, system 102 enables users of the social network system to specify and/or consent to the use of personal information, which may include the system 102 using their faces in photos or using their identity information in recognizing people identified in photos. For example, system 102 may provide users with multiple selections directed to specifying and/or consenting to the use of personal information. For example, selections with regard to specifying and/or consenting may be associated with individual photos, all photos, individual photo albums, all photo albums, etc. The selections may be implemented in a variety of ways. For example, system 102 may cause buttons or check boxes to be displayed next to various selections. In one implementation, system 102 enables users of the social network to specify and/or consent to the use of their photos for facial recognition in general.

Implementations described herein provide various benefits. For example, implementations can enable multiple users to generate compositions that minimize distortion associated with generating compositions from combinations of photos. Implementations described herein may also increase overall engagement among end-users in a social networking environment.

Figure 3:
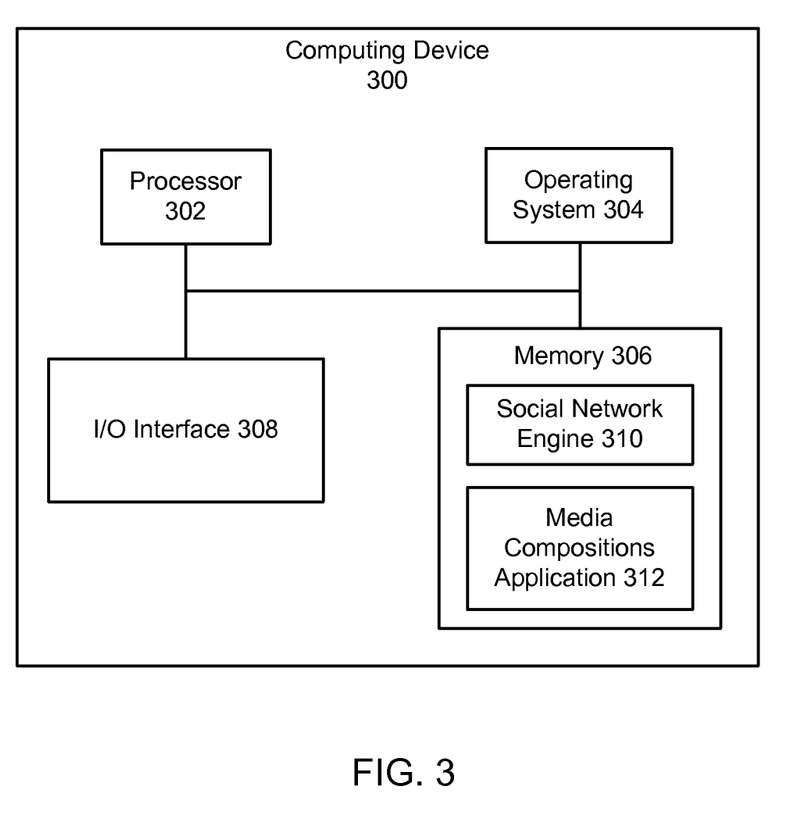
FIG. 3 illustrates a block diagram of an example server device, in accordance with some implementations.

FIG. 3 illustrates a block diagram of an example computing device 300 (e.g., server, user device, or the like), which may be used to implement the implementations described herein. For example, computing device 300 may be used to implement server device 104 of FIG. 1, as well as to perform the method implementations described herein. In one implementation, computing device 300 includes a processor 302, an operating system 304, a memory 306, and an input/output (I/O) interface 308. Computing device 300 also includes a social network engine 310 and a media composition application 312, which may be stored in memory 306 or on any other suitable storage location or computer-readable medium. Media composition application 312 provides instructions that enable processor 302 to perform the functions described herein and other functions.

For ease of illustration, FIG. 3 shows one block for each of processor 302, operating system 304, memory 306, I/O interface 308, social network engine 310, and media application 312. These blocks 302, 304, 306, 308, 310, and 312 may represent multiple processors, operating systems, memories, I/O interfaces, social network engines, and media composition applications. In other implementations, computing device 300 may not have all of the components shown and/or may have other elements including other types of elements instead of, or in addition to, those shown herein.

Figure 4:
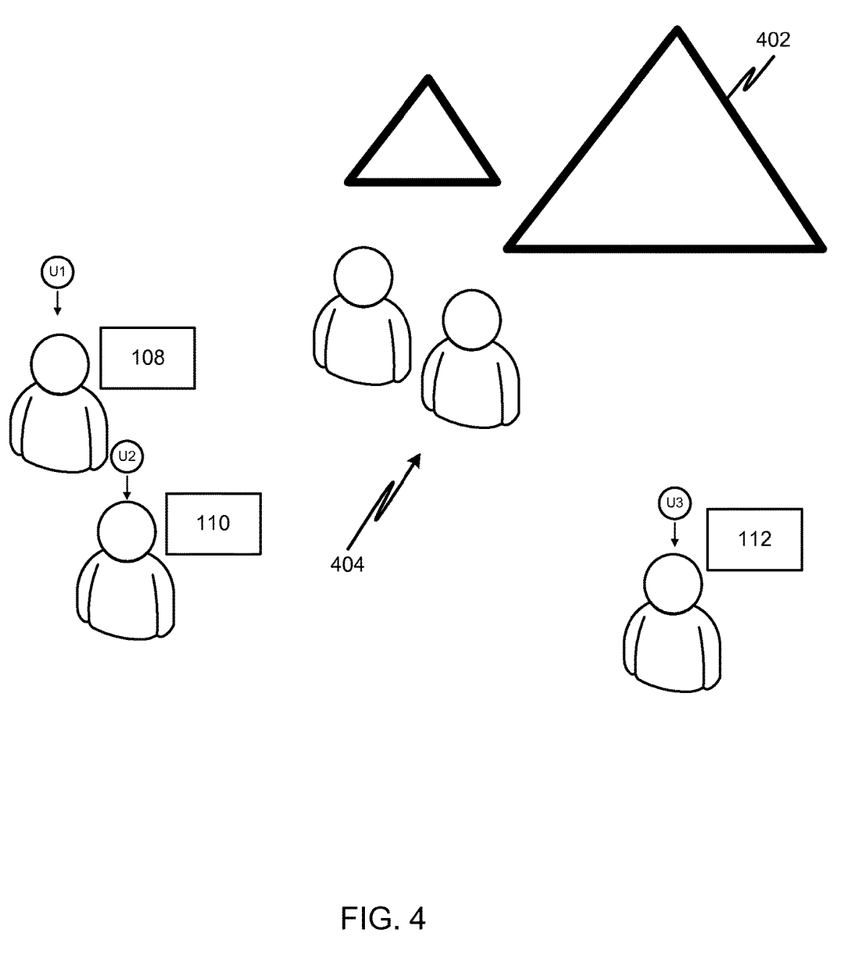
FIG. 4 is a diagram of an example group of users for which actuation of devices can be synchronized for generating a media composition in accordance with some implementations.

FIG. 4 is a diagram of an example group of users for which actuation of devices can be synchronized for generating a media composition in accordance with some implementations. In particular, a group of users (U1-U3) having respective user devices 108-112 may be at or near a similar location (e.g., the pyramids 402). An implementation of a system as described herein can detect that the user devices are at or near the same location and can synchronize the acquisition of media (e.g., taking of photos) among the devices.

Figure 5A:
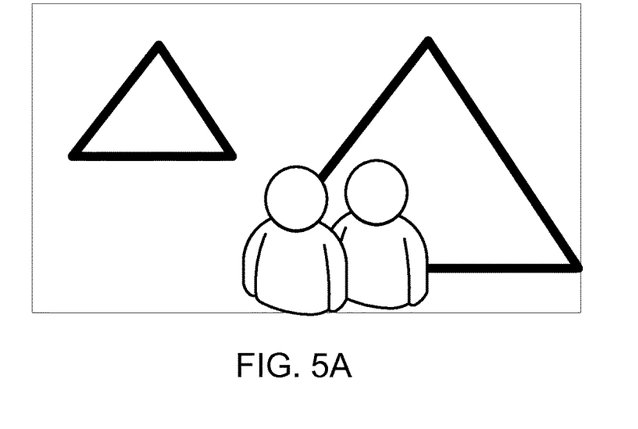
FIGS. 5A-5C show diagrams of example media captured by the user devices shown in FIG. 4 in accordance with some implementations.
Figure 5B:
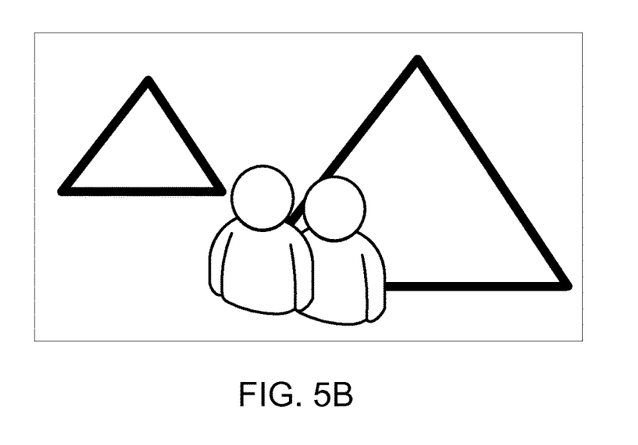
Figure 5C:
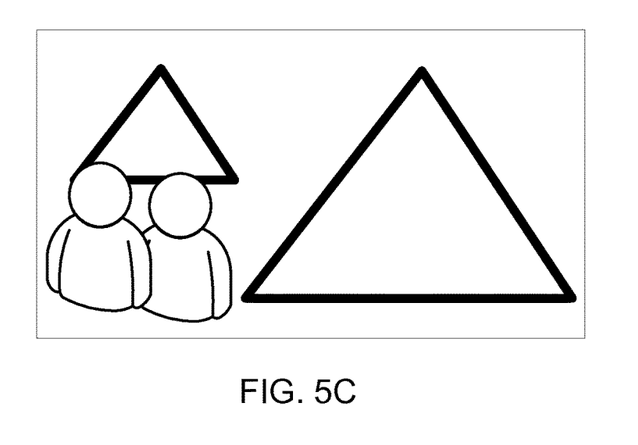

Based on a signal (e.g., a timer, or other synchronization signal), the three devices 108-112 can each actuate their respective cameras and acquire images (e.g., FIGS. 5A-5C, which correspond to the images from devices 108, 110 and 112 respectively). In this example, while attempting to take pictures of the pyramids 402, a group of people 404 partially blocks the view of the pyramids from all three users.

FIGS. 5A-5C show diagrams of example media captured by the user devices shown in FIG. 4 in accordance with some implementations. As can be seen in FIGS. 5A and 5B, users U1 and U2 were able to obtain unobstructed images of the smaller pyramid. However, the larger pyramid was at least partially obscured by the people 404 in the foreground. User U3 was able to take image with an unobstructed view of the larger pyramid and an obstructed view of the smaller pyramid.

The system can receive the three images (FIGS. 5A-5C), analyze the type and content of the images and generate a composition as described above. For example, the system can determine that the pictures of landmarks (e.g., the pyramids) and that two of the images have an unobstructed view of the smaller pyramid and one of the images has an unobstructed view of the larger pyramid. The system can then generate a composition (FIG. 6) that includes the image of the smaller pyramid from FIG. 5A or 5B and the image of the larger pyramid from FIG. 5C. Thus, the composition image can include unobstructed views of both pyramids.

Figure 7:
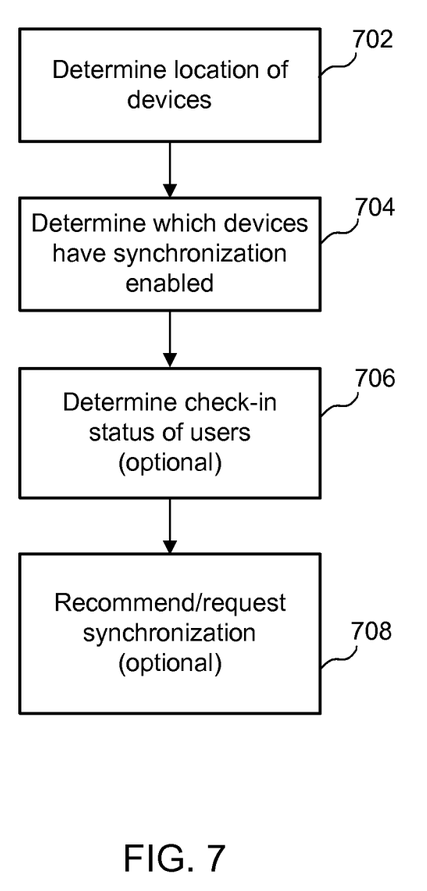
FIG. 7 is an example simplified flow diagram for detecting devices that might be synchronized in accordance with some implementations.

FIG. 7 is an example simplified flow diagram for detecting devices that might be synchronized in accordance with some implementations. Processing begins at 702, where the location of two or more devices is determined using one or more of the methods described above or any now know or later developed suitable location determination technology. Processing continues to 704.

At 704, the system determines which devices at or near the same location have synchronization enabled. The users of each device may have enabled synchronization via settings on their respective devices or may have enabled synchronization via a social network. Processing continues to 706.

At 706, the system optionally determines a check-in status of one or more users and can use the check-in status as a proxy for location or to augment location information that has already been determined. Processing continues to 708.

At 708, users can optionally be provided with a recommendation or request for synchronization. It will be appreciated that 702-708 can be repeated in whole or in part.

Figure 8:
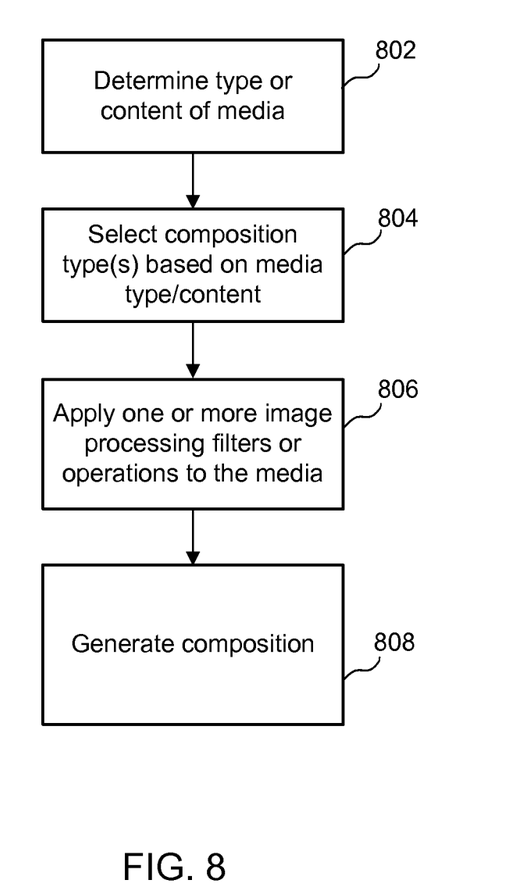
FIG. 8 is an example simplified flow diagram for generating a media composition in accordance with some implementations.

FIG. 8 is an example simplified flow diagram for generating a media composition in accordance with some implementations. Processing begins at 802, where the system determines the type or content of received media. For example, the system can determine (in the case of FIGS. 4-6 above) that the media includes three landmark photos. The determination of the type and/or content of the media can be used to determine composition type and image processing filters to apply. Processing continues to 804.

Figure 6:
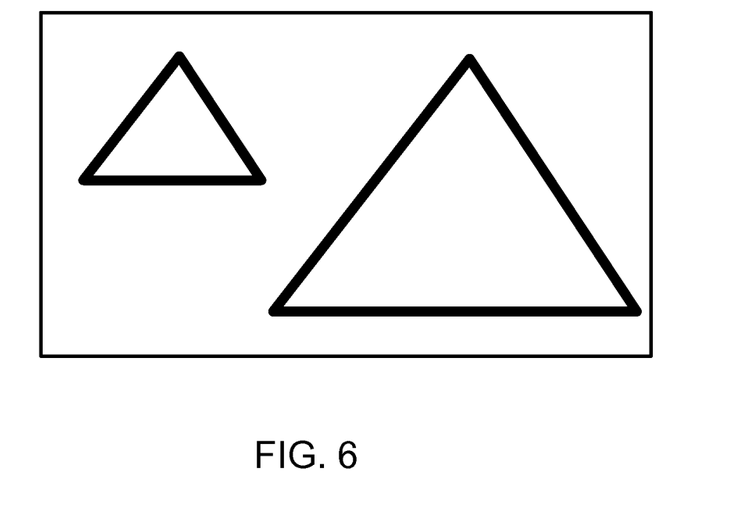
FIG. 6 shows a diagram of an example media composition based on the images shown in FIGS. 5A-5C in accordance with some implementations.

At 804, one or more compositions are selected based on the media type and/or content. For example, based on images 5A-5C, the system may select a composition to eliminate or reduce obscuration (as shown in FIG. 6). Processing continues to 806.

At 806, one or more image processing filters or functions is applied to the media. For example, the system may apply a function of combining images as described above, or may apply an HDR function or the like. In general, any image processing function suitable for generation a composition could be used. Processing continues to 808.

At 808, the system generates the composition. It will be appreciated that 802-808 can be repeated in whole or in part.

Although the description has been described with respect to particular implementations thereof, these particular implementations are merely illustrative, and not restrictive. Concepts illustrated in the examples may be applied to other examples and implementations.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some particular implementations, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

The memory 306, or data storage and/or nontransitory computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

The client (or user) device(s) can include, but are not limited to, a desktop computer, a laptop computer, a portable computer, a tablet computing device, a smartphone, a feature phone, a personal digital assistant, a media player, televisions, an electronic book reader, an entertainment system of a vehicle or the like. Also, user devices can include wearable computing devices (e.g., glasses, watches and the like), furniture mounted computing devices and/or building mounted computing devices.

Some user devices can be connected to a social network and/or media composition system via a network (e.g., 150). The network connecting user devices to the social network and/or media composition system can be a wired or wireless network, and can include, but is not limited to, a WiFi network, a local area network, a wide area network, the Internet, or a combination of the above.

The data storage, memory and/or computer readable medium can be a nontransitory medium such as a magnetic storage device (hard disk drive or the like), optical storage device (CD, DVD or the like), or electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or nontransitory computer readable media having stored instructions for monochromatic image determination as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for generating media compositions.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

The invention claimed is:

1. A method comprising:
   detecting a plurality of devices at a same location based on one or more location criteria;
   receiving, from a user associated with at least one of the plurality of devices, an indication of a time of actuation of the plurality of devices;
   in response to determining that a current time matches the time of actuation, synchronizing an actuation of a function in each of the devices;
   receiving media captured by the function from each of the devices; and
   generating one or more compositions from the media received from each device.

2. The method of claim 1, wherein the media includes photos and the one or more compositions include panorama compositions based on a combination of the photos.

3. The method of claim 1, wherein the synchronizing of the actuation of the plurality of devices corresponds to an event.

4. The method of claim 1, wherein the one or more compositions include high dynamic range image compositions.

5. The method claim 1, wherein the one or more location criteria are based on one or more of distance measurements between devices and distance measurements from a device to another object.

6. The method of claim 1, wherein the one or more location criteria are based on check-in data.

7. The method of claim 1, further comprising providing the one or more compositions to a user.

8. A system comprising one or more processors configured to perform operations including:
   detecting a plurality of devices at a same location based on one or more location criteria;
   receiving, from a user associated with at least one of the plurality of devices, an indication of a time of actuation of the plurality of devices;
   in response to determining that a current time matches the time of actuation, synchronizing an actuation of a function in each of the devices;
   receiving media captured by the function from each of the devices; and
   generating one or more compositions from the media received from each device.

9. The system of claim 8, wherein the plurality of devices are synchronized to actuate the function at the same time.

10. The system of claim 8, wherein the media includes photos and the one or more compositions include panorama compositions based on a combination of the photos.

11. The system of claim 8, wherein the synchronizing of the actuation of the plurality of devices corresponds to an event.

12. The system claim 8, wherein the one or more location criteria are based on one or more of distance measurements between devices and distance measurements from a device to another object.

13. A nontransitory computer readable medium having stored thereon software instructions that, when executed by a processor, cause the processor to perform operations including:
   detecting a plurality of devices at a same location based on one or more location criteria;
   receiving, from a user associated with at least one of the plurality of devices, an indication of a time of actuation of the plurality of devices;
   in response to determining that a current time matches the time of actuation, synchronizing an actuation of an image capture function in each of the devices;
   receiving respective media captured by the image capture function from each of the devices, wherein the respective media are each captured by a respective device of the plurality of devices at a same time that corresponds to the actuation of the image capture function; and
   generating one or more compositions from the respective media received from each device.

14. The nontransitory computer readable medium of claim 13, wherein the media includes photos and the one or more compositions include panorama compositions based on a combination of the photos.

15. The nontransitory computer readable medium of claim 13, wherein the one or more location criteria are based on check-in data.

16. The method of claim 1, further comprising determining at least one of a type of the media and a content of the media, wherein generating the one or more compositions comprises generating the one or more compositions that are selected based on at least one of the type of media and the content of the media.

17. The method of claim 1, wherein the function is an image capture function, and wherein the media are captured by a respective device of the plurality of devices at a time that corresponds to the actuation.

18. The system of claim 8, wherein the one or more processors are configured to perform further operations including determining at least one of a type of the media and a content of the media, and wherein the one or more compositions are based on at least one of the type of media and the content of the media.

19. The system of claim 8, wherein the function is an image capture function.

20. The method of claim 1, further comprising:
   receiving, from a respective user of each of the plurality of devices, a synchronization indication to synchronize activation of a respective device of the plurality of devices and a signal that the respective device of the plurality of devices is ready to capture target subject matter.

* * * * *